Figure 1:
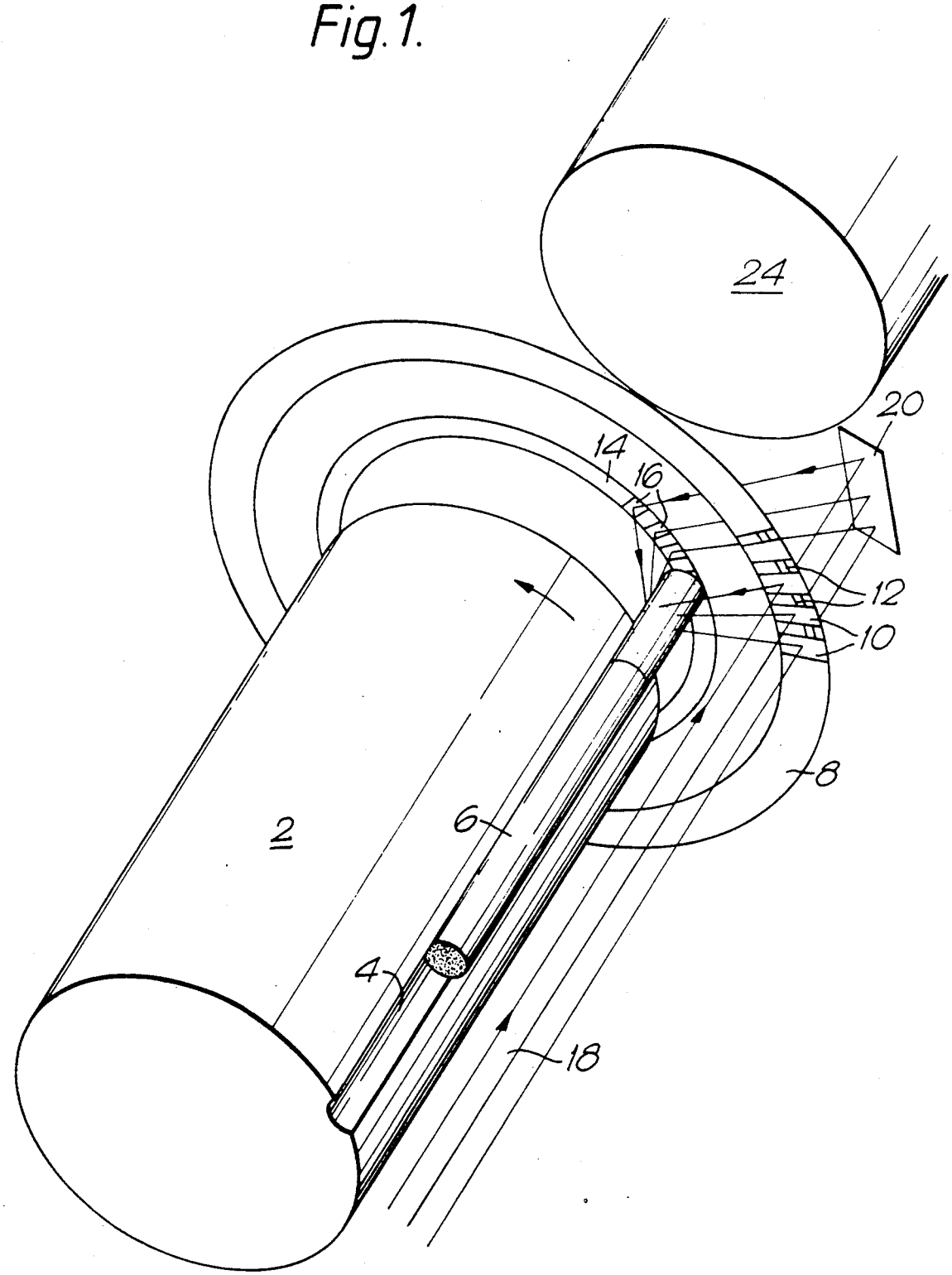

United States Patent [19]

Aindow et al.

[11] Patent Number: 5,052,414

[45] Date of Patent: Oct. 1, 1991

[54] CIGARETTE PERFORATION APPARATUS AND METHOD

[75] Inventors: Alan M. Aindow; Michael J. Cahill; John Dawson, all of Coventry, England

[73] Assignee: Molins plc, Milton Keynes, England

[21] Appl. No.: 514,554

[22] Filed: Apr. 26, 1990

[30] Foreign Application Priority Data

Apr. 27, 1989 [GB] United Kingdom ............... 8909630
Jun. 23, 1989 [GB] United Kingdom ............... 9814497

[51] Int. Cl.$^5$ ............................................. A24C 1/38
[52] U.S. Cl. ...................................................... 131/281
[58] Field of Search ........................................ 131/281

[56] References Cited

U.S. PATENT DOCUMENTS 4,524,785 6/1985 Seragnoli et al. .................. 131/281
4,648,412 3/1987 Heitmann ............................ 131/281

Primary Examiner—V. Millin
Assistant Examiner—Lynne A. Reichard
Attorney, Agent, or Firm—Antonelli, Terry, Stout & Kraus

[57] ABSTRACT

Various arrangements are disclosed for perforation by laser of cigarettes carried on a fluted drum without rolling. In one arrangement (FIGS. 1-3) rings of reflectors (8, 14) movable with the drum (12) intercept and direct a continuous laser beam (18). In another arrangement (FIGS. 4,5) cigarettes (28) are perforated while being conveyed past a fixed focus pulsed beam (32) which has a selected profile and is redirected between passing cigarettes to perforate cigarette at other positions. Other arrangements include using a rotating disc (FIGS. 6-8) or rotary stepped reflector (FIGS. 9, 13, 14) to share a beam between different cigarettes or produce two rows of perforations on a cigarette, using a continuous reflective surface (FIGS. 10, 11) to reflect a rotating beam at passing cigarettes, and causing a beam to partially track a moving cigarette (FIG. 12).

50 Claims, 9 Drawing Sheets

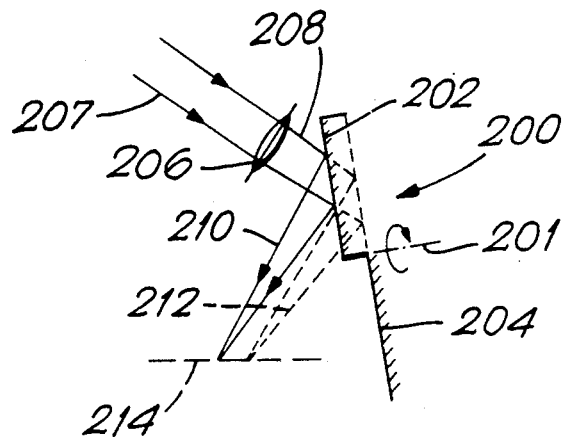
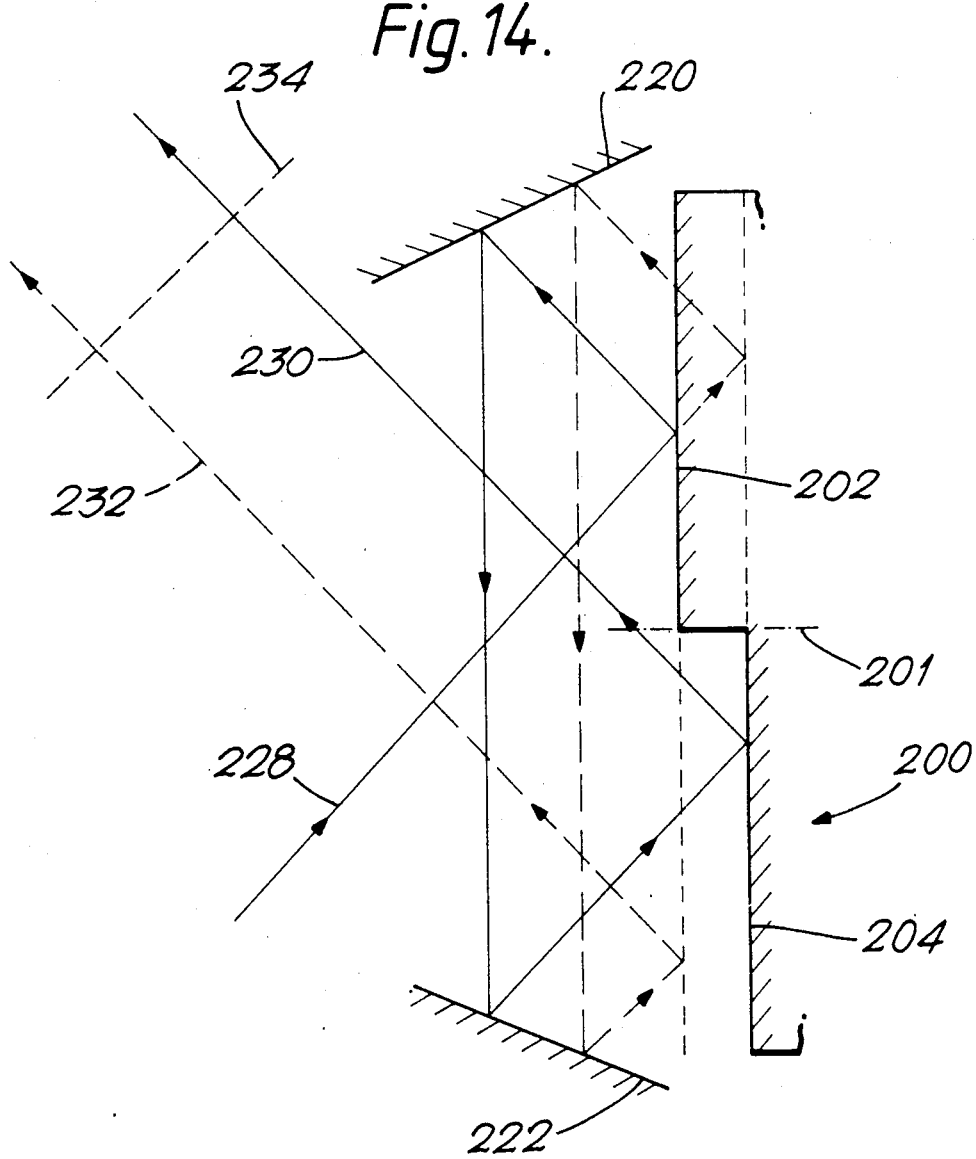

CIGARETTE PERFORATION APPARATUS AND METHOD

This invention relates to cigarette manufacture, particularly the manufacture of ventilated cigarettes which have perforations generally in the region of the filter or mouth end of the cigarette.

It is known to produce perforations in the wrappers of complete or nearly complete cigarettes by means of a focused laser beam. Known systems for achieving this typically involve rotating the cigarette about its own axis, which can be damaging to the cigarette, or are mechanically or optically complicated, or require excessively high levels of laser power. An object of the present invention is to alleviate at least some of these potential problems.

According to one aspect the invention provides apparatus for making perforations in cigarettes, comprising a conveyor for carrying a series of spaced cigarettes in a direction transverse to their lengths, means for directing a beam of laser radiation along a path, a reflector for intercepting the beam on said path, the reflector being movable with the conveyor and causing at least part of the beam to be redirected at least one cigarette on the conveyor for making a perforation in the wrapper thereof while the reflector is in said path. Preferably there is a plurality of reflectors, each reflector being associated with a cigarette position on said conveyor.

For avoidance of doubt, although the term "laser" is used throughout, the invention is applicable to any suitable coherent radiation capable of burning or otherwise forming perforations in the wrappers of cigarettes. Additionally, reference herein to "cigarettes" is not intended to exclude similar smokable articles or to exclude incomplete or unfinished cigarettes or assemblies from which cigarettes are produced. For example, a filter attachment machine generally produces double length assemblies which are subsequently divided at their mid-points to produce filter cigarettes: the invention is applicable to perforation of such assemblies.

Preferably the reflector is movable along a path which transverse the path of the beam. More than one reflector may be simultaneously in the beam path, each reflector in the beam path directing part of the beam at different parts of the same or different cigarettes on the conveyor. There may be an array of reflectors movable through the beam path for directing parts of the beam at different parts of cigarettes. The reflector or reflectors may be arranged to intercept only part of the beam and/or to intercept the beam for part of the time only. In this case that part of the beam which does not impinge on a reflector may be directed along a further path at different parts of the same or different cigarettes on the conveyor. The further path may include a stationary reflector and/or further reflectors movable with the conveyor.

In a preferred arrangement, wherein the conveyor is a drum carrying cigarettes in spaced flutes, an array of reflectors may be supported on an annular ring arranged coaxially with the drum. The laser beam path preferably extends parallel to the axis of rotation of the drum and ring. The ring may comprise a series of reflectors each of which comprises a parabolic mirror (or combination of mirror and lens) arranged to focus the beam on a particular part of a cigarette when the reflector is in the beam path. Thus, each reflector may be associated with a particular part of a cigarette in a particular flute. A number n of such reflectors may be provided for producing n circumferentially-spaced perforations in each cigarette. If there are N cigarettes carried by the conveyor the number of reflectors required is nN.

The ring carrying the reflectors may have a diameter greater than that of the drum carrying the cigarettes, so that conveniently radially-outer direction. In this case it is preferred to provide a radially-outer direction. In this case it is preferred to provide a second annular ring of reflectors to direct radiation at parts of the cigarettes which are radially inwardly-facing relative to the drum. The outer ring may comprise elements intended to direct radiation towards the inner ring. Such elements may comprise gaps between reflectors in the first ring, through which gaps radiation passes as the ring rotates through the beam path and is directed at a stationary reflector which in turn redirects the radiation at the second and inner ring of reflectors. As before, for production of n perforations on N cigarettes by the inner ring there would preferably be nN reflectors in the second ring. It follows that the outer ring may conveniently have nN reflectors separated by nN gaps.

Instead of gaps allowing radiation to pass beyond the first or outer ring, some or all of the reflectors on that ring could be semi-silvered to allow some of the radiation to be directed towards the inner ring, e.g. by said stationary reflector.

The elements of the outer ring intended to direct radiation towards the inner ring may comprise further reflectors for directing radiation directly towards the inner ring. In this case all of the focusing could be achieved by reflectors on the outer ring, the inner ring comprising a series of flat reflectors.

It will be appreciated that although the preferred arrangement has been described with reference to inner and outer rings, wherein the outer ring is in a sense the primary ring which either directs radiation to a cigarette or to the inner ring, it is in principle possible to reverse the roles of the inner and outer rings such that the inner ring becomes the primary ring intercepting the beam path. One reason why it is preferred that the outer ring should be the primary ring, however, is that necessarily its circumference is larger than the inner ring so that it can more easily accommodate the higher number of reflective or other elements required on the primary ring.

It should be understood that reference herein to use of reflectors for focusing a laser beam is intended to include a combination of reflectors and separate focusing elements, e.g. lenses.

Since the beam is switched automatically between various parts of cigarettes by passage of reflectors (and/or gaps) through the beam path it is possible to use a continuous laser beam instead of a pulsed beam commonly used hitherto. This allows more efficient use of the laser and hence use of a laser of lower power. In particular a wave guide laser can be used instead of the higher power low pressure gas lasers previously necessary (although use of such gas lasers is not excluded).

According to another aspect of the invention a method of making perforations in cigarettes, comprises conveying cigarettes along a first path in a direction transverse to their lengths, directing a beam of laser radiation, successively intercepting the beam with means movable with the cigarettes to cause the beam to be redirected along a plurality of second paths, said second paths intercepting said first path at positions spaced on said first path and from different directions, so that a cigarette receives circumferentially spaced perforations from the beams on said second paths as it is conveyed on said first path. Thus, a laser beam or part thereof is switched between different parts of the same or different cigarettes carried on a conveyor by means of beam intercepting elements movable through the beam with the conveyor, so that a series of circumferentially-spaced perforations is made on a cigarette while carried by the conveyor without rotating the cigarette relative to its own axis.

In a preferred arrangement the beam may be sequentially or simultaneously directed along paths which subsequently impinge respectively on opposite sides of a cigarette on the conveyor. Where the conveyor is a drum the paths may extend to radially-inner and radially-outer parts of the cigarette relative to the drum.

According to a further aspect of the invention a series of circumferentially-spaced perforations is made in a cigarette as it is conveyed past a pulsed laser beam, the focusing position of the beam being selected so that acceptable perforations are made over a substantial part of the circumference (e.g. over an arc extending through up to 120° of a cigarette. Preferably the cigarette is conveyed without rotation about its own axis, although it may be conveyed on a rotary conveyor, e.g. a fluted drum. It will be appreciated that where a cigarette is conveyed past a focused beam without rotation about its own axis the distance of the outer circumference of the cigarette from the laser source, as well as the angle of incidence of the beam on the cigarette, will normally change due to the curvature of the cigarette. In a preferred arrangement the focusing position is selected so that the slightly increased area of the beam away from its true focus point compensates for the variable area of the wrapper on which the beam is incident, the focusing position being selected so that the perforations made are of substantially equal areas (although differing in shape). More than one beam may be used to provide perforations over more of the circumference of a cigarette than can readily be perforated directly by a single beam. Second or subsequent beams may be derived by reflecting or otherwise directing part of the first beam along a different path. Alternatively two or more laser sources, e.g. wave guide lasers, respectively directing beams at different parts of cigarettes, may be used. The beams need not impinge simultaneously on the same cigarette, and may be conveniently directed at spaced positions on a conveyor path for cigarettes, e.g. at angularly-spaced positions on a conveyor drum.

According to a further aspect of the invention at least two circumferentially-spaced perforations are made in a cigarette as it is conveyed past a pulsed laser beam, the focusing arrangement of the beam being selected so that acceptable perforations are made at circumferentially-spaced positions. Preferably the focusing arrangement is selected to produce a varying cross-sectional profile of the beam, at least in the region where it will impinge on the circumference of the cigarette. The beam cross-sectional profile may be arranged so that it differs in size and/or shape at the different positions at which it is desired to form the perforations, and preferably so as to compensate at least partly for differences in at least one of the following parameters relating to the portion of the circumference of the wrapper to be perforated and on which the beam is incident during perforation: distance from said focusing arrangement; angle of incidence of the beam; speed of movement relative to the beam. Said compensation is preferably such as to provide perforations of substantially equal areas: these need not be of the same shape.

According to a further aspect the invention provides a method of perforating cigarettes in which cigarettes are conveyed in sequence past a pulsed laser beam which applies a plurality of circumferentially-spaced perforations to part of each cigarette as it passes the beam, including the step of directing the beam during periods when it is not perforating said passing cigarettes so that it applies perforations to at least one different part of a cigarette. The different part may be on a different cigarette, i.e. located at a position which differs from that of said passing cigarette. Thus, for example, if the beam is used to apply a series of circumferentially-spaced perforations to a part of a circumference of a passing cigarette, which part is radially-outer relative to a drum conveying the cigarettes, the beam may be directed across the drum between (or around) said passing cigarettes and re-focused so that it applies a series of circumferentially-spaced perforations to a radially-inner part of the circumference of another cigarette substantially opposite said passing cigarette. Alternatively, one or more mirrors could be used to direct the beam towards radially inner parts of said passing or an adjacent cigarette.

If the leading "edge" of each conveyed cigarette is denoted as 0° relative to the axis of the cigarette and the "edge" which passes closest to the immediate laser source is denoted as 90°, it should be noted that it is relatively easy to achieve perforations in the angular sector 30°–150° as each cigarette passes the beam. Similarly, by redirecting the beam as described above, perforations may be achieved in the sector 210°–330°. In order to produce perforations in the range 150°–210° and 330°–30°, e.g. at 180° and 0°, a beam extending radially outwards relative to a conveyor drum, e.g. a redirected beam having passed across the drum or having been redirected by a mirror may be further directed by a suitably-angled and focused mirror arranged to produce a beam which is almost tangential to the drum. Alternatively, where one or more laser sources of suitable power are used to produce perforations in the approximate ranges 30°–150° and 210°–330° one or more auxiliary lasers of lower power could be used to make the fewer perforations required in the approximate ranges 150°–210° and 330°–30°. It should be noted that it may not be necessary to perforate uniformly around the circumference of a cigarette. Thus the cigarette may be perforated around those parts of the circumference (e.g. 30°–150° and 210°–330°) which are more readily accessible, and other parts may be left unperforated. In order to provide more even ventilation for cigarettes perforated in this way the perforations at the extremities of the perforated regions may be made larger and/or deeper so that they extend partly in or towards those regions adjacent the unperforated parts of the circumference of the cigarettes.

In a filter attachment machine it is conventional for two streams of filter cigarettes to issue, with their filter tip ends facing in different directions. The same laser beam may be used to perforate cigarettes in both streams by using one or more semi-silvered mirrors to power-share the beam, or by use of a time-sharing device, e.g. a rotating disc having alternate reflecting and clear segments. Thus, in a preferred arrangement, a beam is directed in a direction which is parallel to cigarettes conveyed transversely in two streams such that the beam is intercepted by a reflective element which directs a first portion of the beam towards a first stream of cigarettes and allows a second portion of the beam to pass towards the second stream of cigarettes. The reflective element may comprise a semi-silvered mirror for power-sharing the beam or a rotatable wheel for time-sharing the beam. Where the element comprises a rotatable wheel, this is preferably synchronised with means for pulsing the laser beam and may be associted with a chopping wheel which has alternate segments which are opaque and transparent to the radiation and which is timed to momentarily interrupt the beam immediately after it has been switched on following each pulse but to allow the remaining portion of each pulse of radiation to pass on to the reflective element. The purpose of the chopping wheel is to interrupt the initial part of each pulse to avoid transient surges immediately after the electronic switching on of each pulse.

According to a further aspect of the invention a laser beam is reflected along a plurality of paths, e.g. by a prism, so that it impinges on a plurality of cigarettes at different positions on a conveyor and so that after successive cigarettes have passed through said positions each has received a series of circumferentially-spaced perforations.

According to a further aspect of the invention apparatus for making perforations in cigarettes, comprises means for conveying cigarettes in sequence in a direction transverse to their lengths, means for directing a laser beam towards a rotary element having movement synchronised with that of the conveying means, the rotary element having stepped reflecting surfaces arranged to intercept the beam in turn and direct it along different paths, and means for focusing the beam on said different paths so that each cigarette receives at least one perforation as it intercepts a beam on each path, said perforations begin in circumferentially-spaced and/or longitudinally-spaced positions on the cigarette. The stepped reflecting surfaces may produce substantially parallel beams which are subsequently reflected and focused on different cigarettes (i.e. cigarettes in different positions).

It is a requirement for some types of cigarette that the perforations are made in two (or more) separate rows which are slightly spaced relative to the length of the cigarette. It is possible to make the rows of perforations in several ways. Clearly two (or more) lasers may be used. Alternatively, a single laser beam could be split so that it passes through two similar optical systems. This may introduce problems of more difficult setting up and/or more frequent adjustment to maintain alignment of the systems. Another way of making the two rows is to deflect a laser beam from one row to the other. This can be achieved by means of an opto-acoustic coupler, which is very expensive and although fast is inefficient at high frequencies, or by means of an oscillating mirror which is efficient but relativly low speed.

An improved method of making the two rows according to the present invention is to use a rotary element having stepped reflecting surfaces. Clearly this could be used to provide separate beams which are then focused separately but this might have the disadvantages mentioned above. If, however, the rotary element is located after the focusing arrangement the stepped surfaces would cause the focused beam to be moved by an amount corresponding to the difference in levels between the stepped surfaces. One complication inherent in using a rotary element of this type in this way is that as well as shifting the beam sideways the focus plane is also moved, due to the different path lengths from the focusing arrangement. Thus the positions of focus of the beam lie on a plane which is generally inclined relative to the beam incident on the reflecting surfaces. Additional lenses or mirrors could be used to bring the beam to a final focus where required. Alternatively, and preferably, however, the cigarettes (i.e. the conveyor drum for the cigarettes) and the original angle of incidence of the beam (i.e. the laser source and/or focusing arrangement) are arranged so that the focal plane remains on the surface of the target cigarettes. In general this means that the original laser beam will be inclined relative to the axis of the drum carrying the cigarettes to be perforated. The change in path length from focusing arrangement to target cigarette can be removed by use of additional stationary mirrors which serve to make the paths from the focusing arrangement to the target the same irrespective of which reflecting surface of the rotary element intercepts the beam.

Use of a rotary element with stepped reflecting surfaces for production of separate rows of perforations is a very simple and effective way of deflecting the beam and as the transition from one path to the other is very rapid the laser could be working on one row or the other substantially continuously thereby using the available laser power very efficiently.

According to a further aspect of the invention a series of circumferentially-spaced perforations is made in a cigarette as it is conveyed in a direction transverse to its length by means of a laser beam which has a component which is radial relative to an axis generally parallel to the cigarette, the beam being rotated about said axis so that it impinges on a series of reflective elements which focus the beam on different parts of a cigarette, the rotation of the beam and the movement of the cigarette being synchronised, and the reflective elements preferably comprising a substantially continuous reflective surface.

According to a further aspect of the invention a method of perforating a cigarette conveyed in a direction transverse to its length comprises causing a laser beam at least partly to track the movement of the cigarette so as to produce a series of circumferentially-spaced perforations in the cigarette. By causing the beam to track the cigarette, but still with some movement relative thereto so as to produce circumferentially-spaced perforations, it is possible to extend the time during which the perforations may be made, as compared with moving the cigarette past a static beam. Such extension of the time during which the laser beam may make the perforations enables a laser of lower maximum power output to be used. A tracking beam which remains in focus in the vicinity of a moving cigarette may be obtained by deflecting a beam extending generally parallel to the cigarette by means of a mirror rotating about a parallel axis so as to produce a beam which traverses in a direction parallel to the movement of the cigarette, and by subsequently using a flat field scanning lens for producing a focused beam travelling for example along a straight line generally parallel to the direction of movement of the cigarette.

It will be appreciated that reliability is an important factor in all aspects of the invention. According to another aspect of the invention this may be improved by using two lasers working through the same optical system. The radiation from the two lasers may be polarised in different directions to avoid interference problems. Each of these may normally make half of the required perforations and can therefore be of lower power (and cost) than a single laser normally capable of making all the perforations. In the event that either of the two lasers fails the other would still allow operation at some combinations of perforation numbe and size, possibly at reduced speed. In addition some lasers have a "super pulse" mode in which higher power but less controlled pulses can be produced, at the expense of a reduction in laser life. Use of lasers with this facility in a two-laser system could permit limited operation at normal speed and ventilation level (i.e. number and size of perforations) with only a single laser working. The "super pulse" mode could also be used to produce abnormally high ventilation levels for short runs. There is relatively low use of very high ventilation levels and it could be advantageous to provide equipment capable of achieving these occasionally but without the cost penalty of incorporating expensive high power lasers. Use of lower power lasers with "super pulse" facility can therefore be very useful, and the reduction in overall life caused by occasional operation at high levels of ventilation acceptable.

It should be noted that the various aspects of the invention may be used in combination or in the same apparatus.

Figure 2:
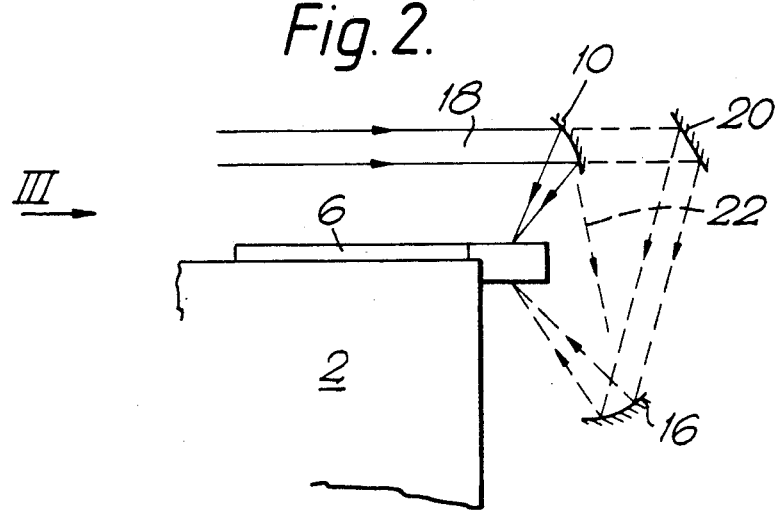
Figure 3:
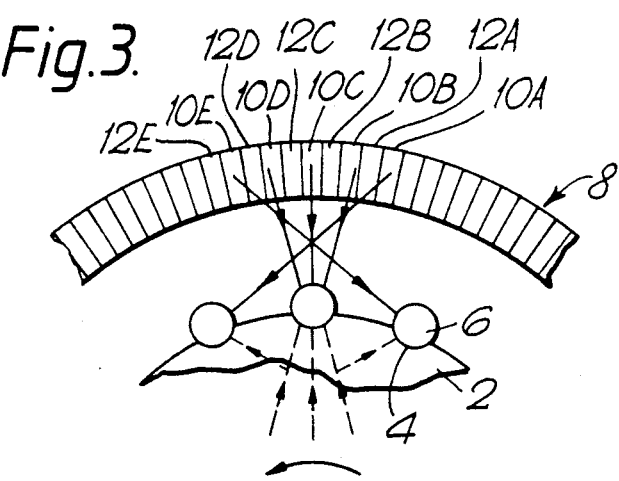
Figure 9:
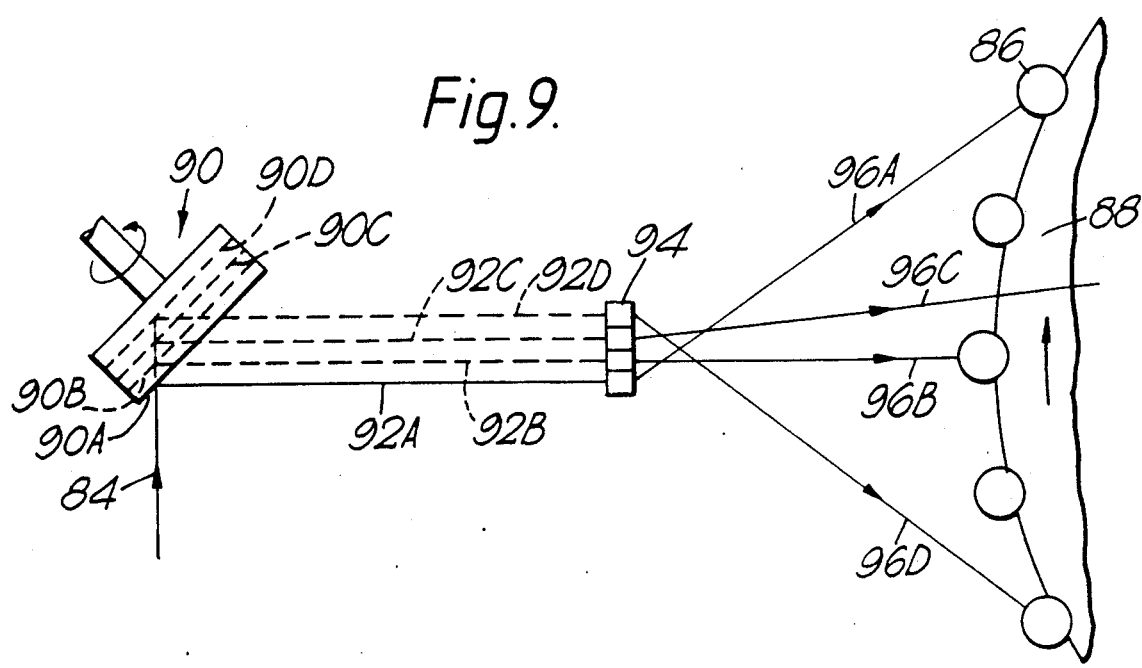
Figure 4:
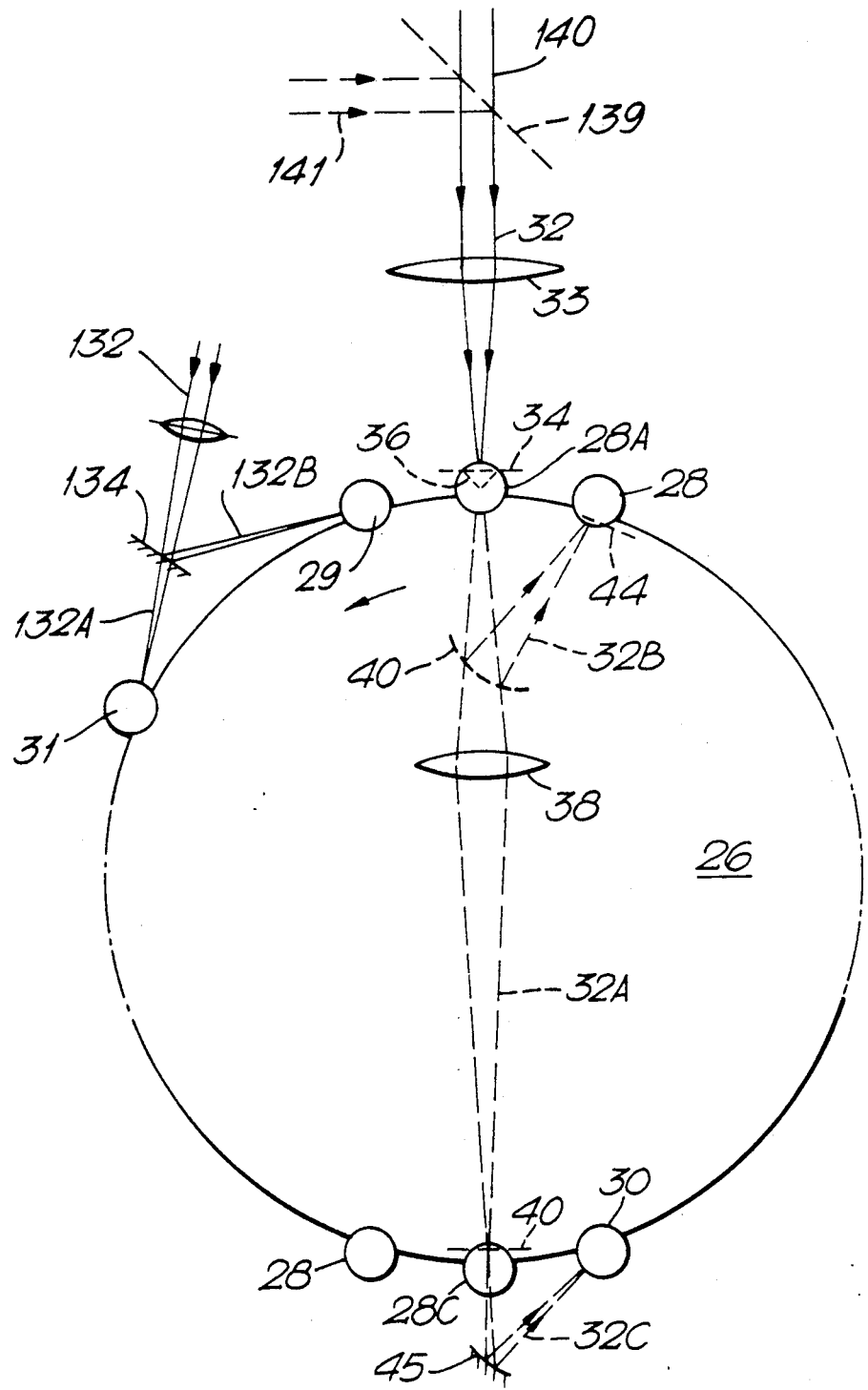
Figure 4A:
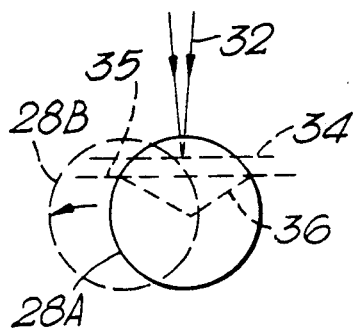
Figure 4B:
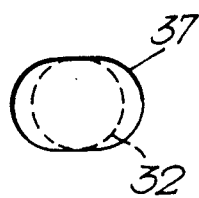
Figure 4C:
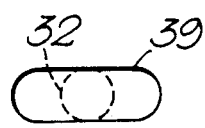
Figure 4D:
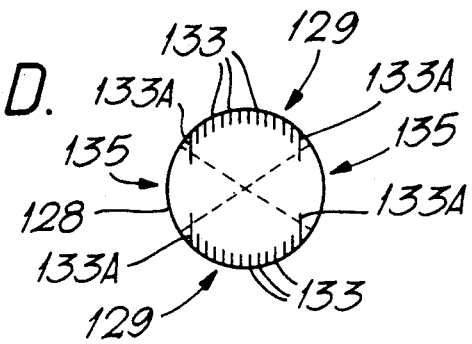
Figure 5:
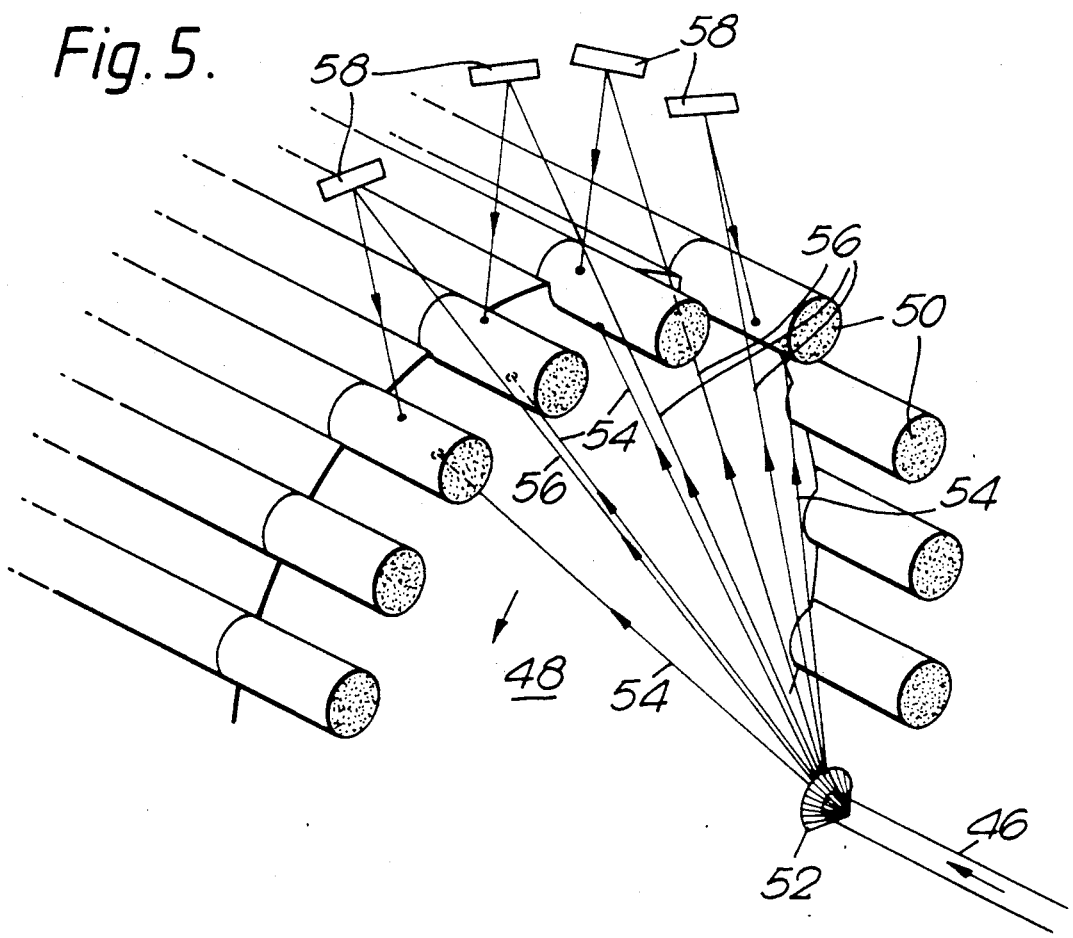
Figure 6:
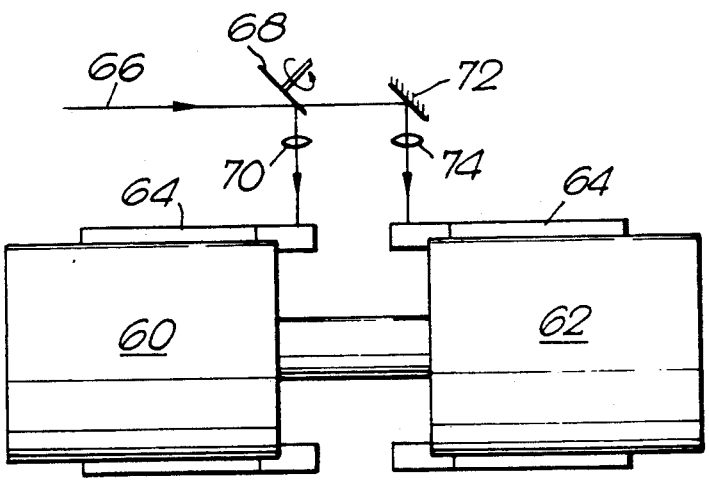
Figure 7:
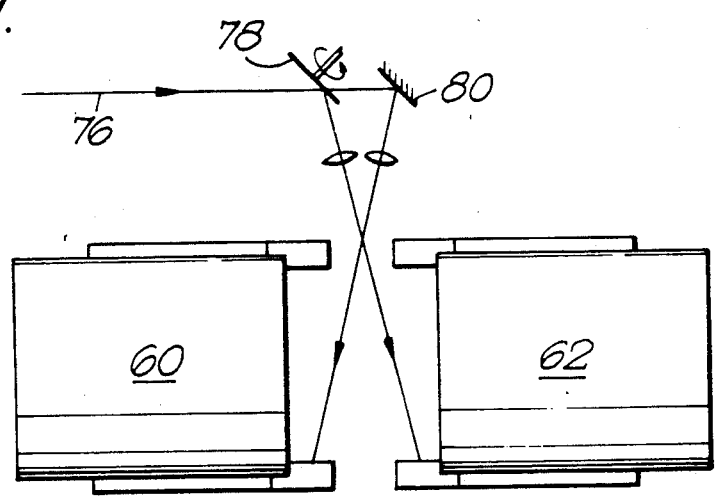
Figure 8:
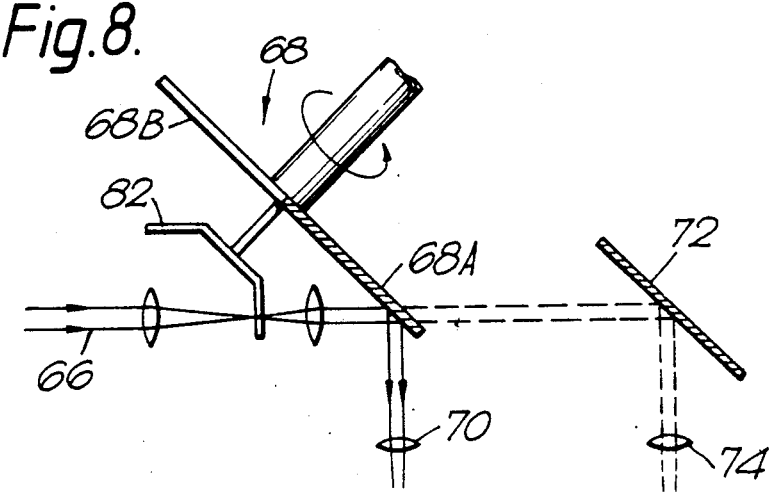
Figure 10:
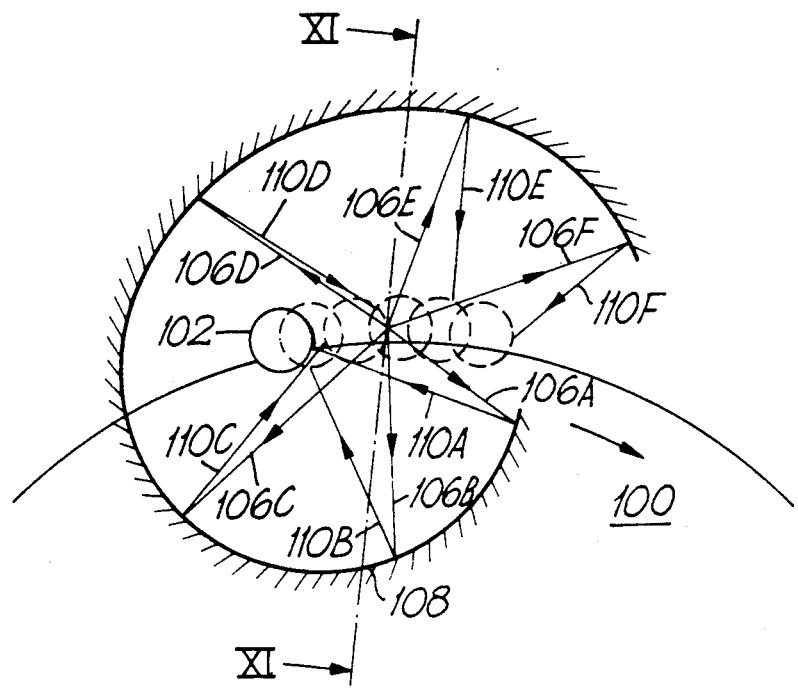
Figure 11:
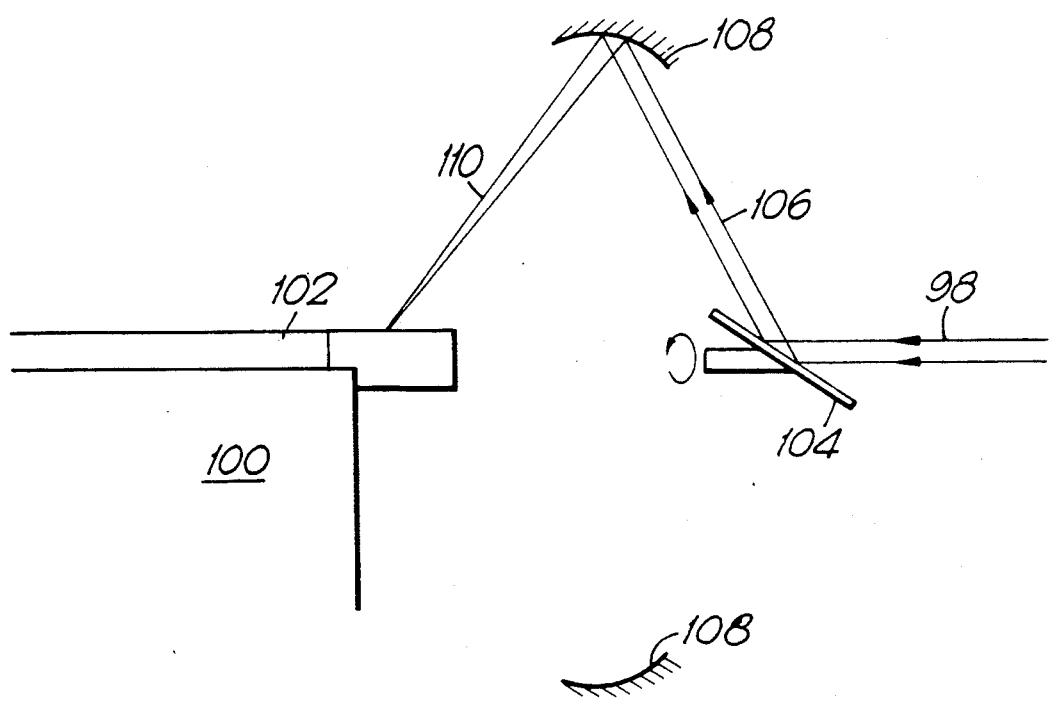
Figure 12:
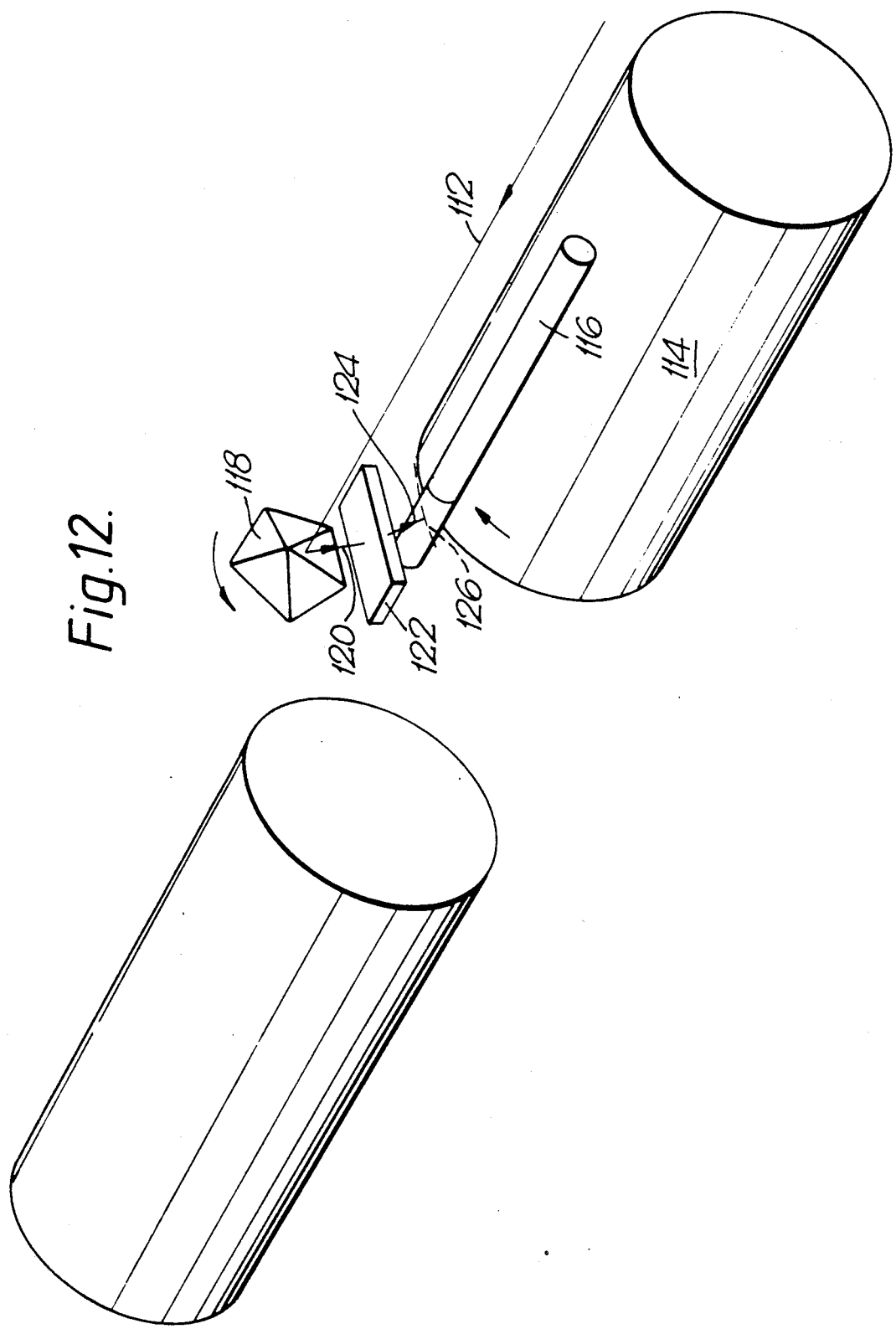
Figure 15:
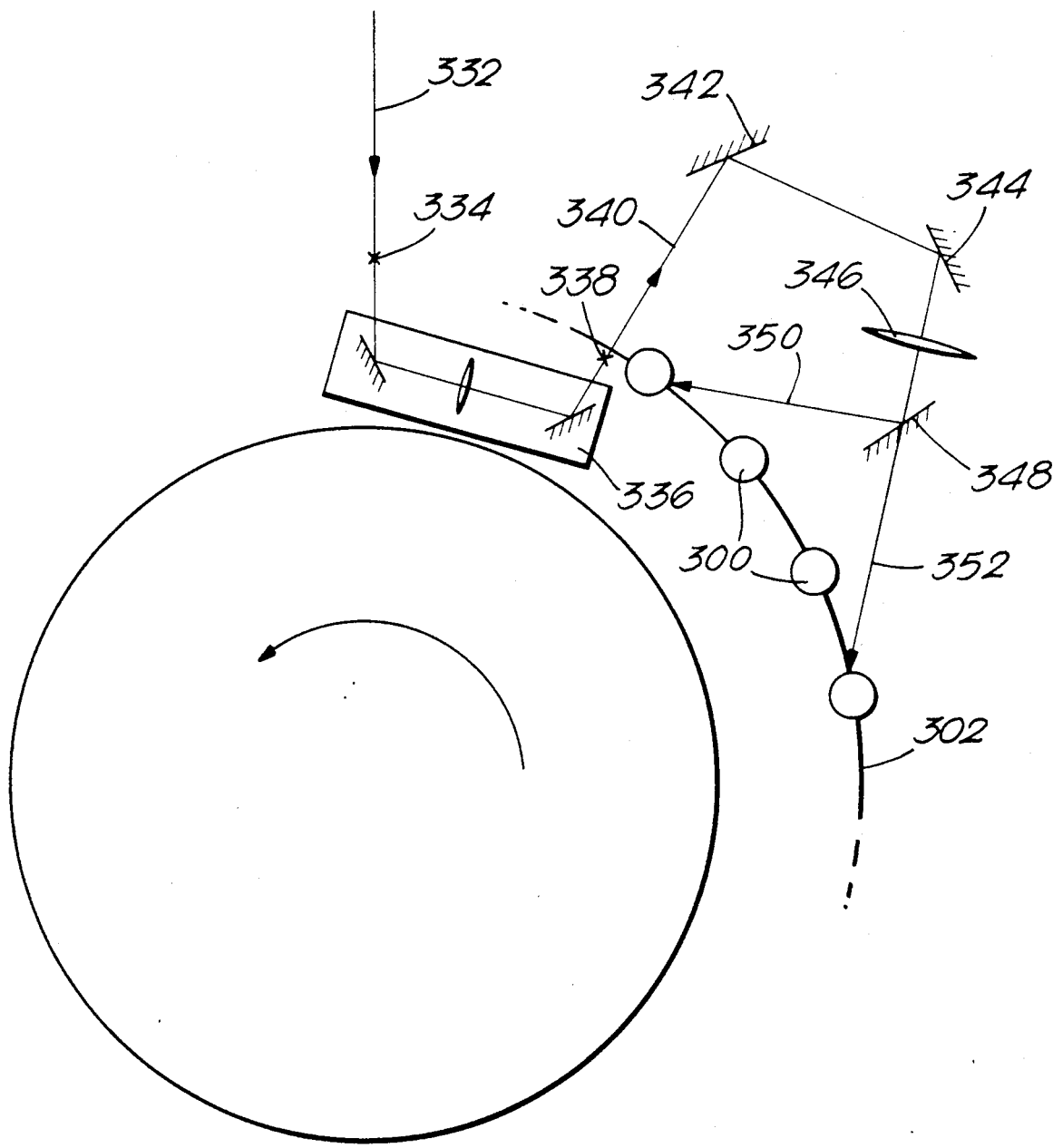

The invention will be further described, by way of example only, with reference to the accompanying diagrammatic drawings, in which:

FIG. 1 is a perspective view of apparatus for perforating the outer wrappers of cigarettes, FIG. 2 is a side view of the apparatus of FIG. 1, FIG. 3 is a view in the direction of arrow III in FIG. 2, FIG. 4 is a side view of another cigarette perforating apparatus, FIGS. 4A, 4B 4C and 4D are enlarged views of details of FIG. 4, FIG. 5 is a perspective view of further cigarette perforating apparatus, FIG. 6 is a sectional view of still further cigarette perforating apparatus, FIG. 7 is a different sectional view of the apparatus of FIG. 6, FIG. 8 is an enlarged side view of part of the apparatus of FIGS. 6 and 7, FIG. 9 is a side view of still further cigarette perforating apparatus, FIG. 10 is a side view of yet further cigarette perforating apparatus, FIG. 11 is a sectional view on the line XI-XI in FIG. 10, FIG. 12 is a perspective view of yet still further cigarette perforating apparatus, FIG. 13 is a side view of yet another cigarette perforating apparatus, FIG. 14 is an enlarged view of a modified part for use with the apparatus of FIG. 13, and FIG. 15 is a side view of further cigarette perforating apparatus FIGS. 1-3 show a conveyor drum 2 provided with regularly-spaced flutes 4 (only one of which is shown in FIG. 1) for conveying filter cigarettes 6. Coaxial and rotatable with the drum 2 is an outer ring 8 carrying an array of spaced focusing mirrors 10 separated by spaces or apertures 12. Also coaxial and rotatable with the drum 2 is an inner ring 14, also carrying an array of spaced focusing mirrors 16.

A laser source (not shown) is arranged to direct a beam 18 of radiation in a direction parallel to the rotational axis of drum 2 so that it is intercepted by the outer ring 8. That part of the beam 18 which is intercepted by a mirror 10 is focused onto the surface of a cigarette 6 on the drum 2. That part of the beam 18 which passes through an aperture 12 is subsequently intercepted by a stationary mirror 20 and directed to the inner ring 14 where a mirror 16 focuses it onto a different part of the surface of a cigarette 6. The beam could be of narrower dimensions than the mirrors 10 and apertures 12, so that normally the entire beam follows the respective different paths as it is successively intercepted by mirrors and apertures of the outer ring 8.

The focusing mirrors 10 and 16 are arranged such that while any particular mirror is intercepted by the beam, it focuses the beam (or, more correctly, that part of it falling on the mirror) on to the same part of the cigarette, as the rings 8 and 14 and drum 2 rotate relative to the beam 18. Each mirror 10 or 16 is therefore associated with a particular flute 4 and, more particularly, with a particular part of a cigarette 6 lying in that flute, and focuses radiation on only that part during the period when it is passing through the beam 18 (deflected by the mirror 20 in the case of the mirrors 16).

Referring to FIG. 3, it may be seen that ten perforations may be made around the perimeter of each cigarette 6 by the focusing mirrors 10A-10E and by the mirrors 16 respectively associated with the parts of the beam 18 passing through the apertures 12A-12E. Note that in FIG. 3, although beams are shown passing from each of the mirrors 10A-10E, the beam 18 would not normally be wide enough to impinge on all of these mirrors simultaneously and may for example extend only over the width of three mirrors, as indicated in FIG. 1. Thus, it should be understood that the perforations in each cigarette 6 are not necessarily made simultaneously, for example there being no beam from the mirror 10A until it reaches the position of mirror 10B in FIG. 3. Note, however, that perforations may be made simultaneously on different cigarettes, as indicated in FIG. 3. The focused beams from the mirrors 16 corresponding with the apertures 12A-12E are shown by dotted lines in FIG. 3. The mirrors 10A-10E and apertures 12A-12E (with corresponding mirrors 16 on the inner ring 14) are together effective to make ten circumferentially-spaced perforations in the wrapper of the filter tip end of a cigarette as it is conveyed by the drum 2 through a region adjacent the laser beam 18. The rings 8 and 14 respectively carry similar series of five mirrors 10, 16 and five apertures 12 angularly centred on each flute 4 of the drum 2.

The beam 18 may be continuously emitted. The passage of the respective mirrors 10 and apertures 12 acts to chop the beam 18, thereby providing that each part of a cigarette 6 receives radiation for a predetermined time. In effect the outer ring 8 acts as an optical commutator. The power of the laser and the width of the beam 18 are chosen in relation to the rotational speed of the drum 2 so that each part of a cigarette 6 required to be perforated receives radiation of predetermined intensity for a predetermined period sufficient to make the required perforations.

Various modifications of the optical arrangements are possible. The mirrors 10 could comprise a combination of mirrors and lenses, so that some or all the focusing is achieved by lenses. Some or all of the focusing for the inner ring 8 could also be achieved by lenses carried by the ring, or by a stationary lens cooperating with the mirror 20, or by a focusing mirror or combination of focusing mirror and lens replacing the mirror 20. A further possibility is that instead of apertures 12 the outer ring 8 could carry mirrors which direct radiation to the inner ring 8 (as indicated by the dotted line 22 in FIG. 2), thereby eliminating the need for a stationary mirror 20. If the mirrors replacing apertures 12 on the outer ring 8 were focusing mirrors (or cooperated with focusing lenses also carried by the outer ring 8) all focusing could be achieved on the ring 8 so that the mirrors 16 on the inner ring 14 need only be flat. All mirrors on both rings 8 and 14 could be flat if focusing were achieved by stationary mirrors or lenses placed in the paths of the individual beams passing to the cigarettes 6 on the drum 2. Instead of providing the outer ring 8 as a series of mirrors 10 and gaps 12, so that the beam 18 is time-shared as the ring rotates, the mirrors 10 could be semi-silvered, so that the beam is power-shared between the focused beams passing directly to the cigarette 6 and those passing via the inner ring 14. Since the gaps 12 would not then be necessary the mirrors 10 would be made angularly larger, thereby compensating for the loss of intensity of the beams passing directly to the cigarette 6 by ensuring that each mirror intercepts the beam for longer. A series of semi-silvered mirrors in the outer ring 8 could therefore be contiguous.

Typically each perforation to be made in a cigarette 6 is of about 0.2 mm in diameter. The beam 18, which may be oval, with a major axis extending generally in the circumferential direction of the ring 8, may have a width (in that direction) of 8-10 mm.

Construction of the rings 8 and 14 may be by die-casting, the reflective surfaces being gold or molybdenum plated.

Although the laser beam 18 could be pulsed, it is preferred to emit radiation continuously, relying on the ring 18 to direct the beam or parts of it to the desired locations as previously mentioned. Continuous use of a laser is more efficient in terms of power utilisation, so that physically smaller and lower power lasers may be used. For example, wave guide lasers, with power outputs of up to about 150 watts, which have not previously been generally usable with laser cigarette perforation systems, may be used with the present arrangement.

It is known to control the size of the perforations in accordance with measured ventilation of previously-perforated cigarettes so as to achieve a desired ventilation level. With a pulsed laser this may be achieved by varying the duration of the pulse. With a continuously-emitting laser the same control may be achieved by varying the power of the laser. For example, the beam 18 may be modified so that the resultant beams on the cigarettes are defocused slightly, i.e. cover a slightly larger area, and the power of the beam increased slightly so as to maintain adequate intensity, thereby making slightly larger perforations. A similar effect may be achieved by oscillating the beam 18 to make it slightly non-parallel to the axis of the drum, again so that the area of the cigarette on which the focused beam is incident may be varied (possibly with increase in duration and/or power of pulse).

The conveyor drum 2 is conveniently located at the downstream end of a filter attachment machine where there are two substantially parallel rows of filter cigarettes with their filter tip ends facing each other, i.e. upstream of a tip turning device. FIG. 1 shows a second conveyor drum 24 for conveying the other row of cigarettes (not shown). The cigarettes in said other row may be perforated by a further apparatus substantially identical to that shown in FIG. 1 but associated with the drum 24.

In the apparatus of FIG. 4 a conveyor drum 26, similar to the drum 2, carries filter cigarettes 28 in regularly-spaced flutes 30 (not all of which are shown in the drawing). The drum 26 carries the filter tip ends of the cigarettes 28, which extend beyond the end of the drum in a manner similar to that shown in FIGS. 1 and 2, past a static laser beam 32 which is focused by a lens 33 at a point on a line 34 through which cigarettes 28 are conveyed in succession by the drum 26. The beam 32 is pulsed several (e.g. five) times as each cigarette 28 passes position 28A beneath the beam, so as to produce several perforations within a sector 36 around an upper part of the circumference of a cigarette. Note that the beam is exactly focused on the surface of a passing cigarette only at positions intermediate the top dead centre of the cigarette and the extremities of the sector 36: one such position is indicated with a cigarette in position 28B in FIG. 4A. The operation relies on the fact that the beam 32 can produce adequate perforations at positions within ±1 mm of its true focus. Thus, as indicated in FIG. 4A, the line 34 is about 1 mm below the top dead centre position of a cigarette 28 passing the beam 32 and about 1 mm above the point of intersection of the sector 36 with the circumference of the cigarette. Thus the perforations can be made on each passing cigarette 28 by pulsing the laser beam 32 so that it produces circumferentially-spaced perforations within the sector 36 as the cigarette passes the beam. The sector 36 extends for about ±60° around the circumference of the cigarette 28.

If it is desired to produce the beam 32 using two lower power lasers, a polarising mirror 139 may be used, this being transparent to a first beam 140 of polarised radiation from a first laser but reflective, as shown in FIG. 4, to a second beam 141 of differently polarised radiation from a second laser. The two lasers time-share the production of perforations and can therefore be of lower power than a single laser producing the beam 32.

Note that all of the perforations made in a cigarette will not be of the same shape: those at the top will be more circular whereas those at the sides will be elongated. The sizes of the perforations can be controlled by duration of the pulses. Preferably the duration of each pulse is controlled so that the perforations have approximately equal areas. If desired the pulses may be deliberately lengthened to produce slots, as opposed to holes: this uses the laser more efficiently. In order to compensate for the fact that perforations made at positions near the edge of the sector 36 are longer than those made at the centre (e.g. at the top of a cigarette) the beam 32 may be focused nearer or even beyond a line (35 in FIG. 4A) passing through the edges of sector 36. Thus, as indicated in FIGS. 4B and 4C, which respectively show perforations 37 and 39 made at the top and side of a cigarette, the beam 32 is slightly defocused and wider at the top of a cigarette and narrower at the side where the beam is at or closer to its focus. Since the length of the perforation 39, caused mainly by the angle of incidence of the beam 32, is greater than that of the perforation 37, caused mainly by movement of the cigarette, it may be arranged that the difference in width of the beam 32 forming the respective perforations 37 and 39 is such as to compensate for the difference in length so that the areas of the perforations 37 and 39 are approximately equal. Thus, for example, if the length of the perforation 39 is approximately twice that of the perforation 37, the areas of the perforations may be made approximately equal by arranging the focusing of beam 32 such that its width at the perforation 37 is approximately twice that at the perforation 39. Note that some elongation of the perforations 37 and 39 occurs because of the movement of the cigarettes, and that the elongation will not be exactly the same for each perforation, due to the slightly different velocities at slightly different radii from the centre of the drum 26.

By way of further explanation it should be appreciated that, as with other optical systems, a combination of lenses and/or mirrors intended to bring a laser beam to a focus produces a spot of a size determined by features of the particular lenses and/or mirrors. The distance over which the spot is of approximately constant size may be referred to as its depth of focus. Because of the differing angles of incidence and slightly different velocities of each perforation or hole "position" and since the energy per unit area required to remove (i.e. burn off) cigarette wrapper can be regarded as constant it follows that for a beam working within its normal depth of focus it is necessary to vary the power of the beam to produce the holes efficiently. Moreover if the area of the holes is required to be constant then the durations of the pulses of the beam producing each hole will differ. In order to avoid the complications of a control system which would be necessary to achieve this the invention provides a profiled beam in which the size (and possibly shape) of the beam changes, as a function of its distance from the final focusing lens or mirror, in such a way that it compensates for the changing angle of incidence and velocity of the target cigarette so that the intensity, i.e. energy per unit area, on the cigarette remains constant. If this is achieved it follows that pulses of the same power and duration will make holes of equal area with the same penetration. It should be noted that the shape of the hole will not be the same at all positions. By appropriate design of the focusing arrangement the beam profile can be made to closely approximate that required, leading to considerable simplification of the control system. In addition, note that not all lasers have the facility to control the power at the rates which would be required absent the "profiled beam" arrangement: the arrangement therefore permits the use of less expensive lasers not having this facility.

The same laser beam 32 can be used to make perforations in other parts of the cigarettes 28 on the drum 26 by being operated during periods when it is not aligned with a cigarette at or near position 28A. Thus, the cigarette in position 28C may be perforated by pulsed beams 32A in the same way as the cigarette 28. An auxiliary focusing lens 38 is provided to focus the beam 32A on a line 40, which is about 1 mm below the top of the cigarette at position 28B so that perforations may be made in a sector extending for about ±60° around each cigarette as before.

In order to allow a straight path for the beam 32A a cigarette in position 28C should be aligned with a gap between cigarettes 28 at the top of the drum 26 (i.e. cigarettes in position 28A and 28C should not be aligned as shown in the drawing). Of course, if necessary the beam 32A could be deflected or redirected (or redirected and focused) by one or more mirrors. In this way the beam passing between cigarettes 28 at the top of the drum 26 could be redirected and focused by a mirror 42 so as to perforate the underside of a cigarette 28 by means of a beam 32B focused on line 44. The beam 32 and lens 33 could be inclined slightly so that the beam 32A avoids the central axis of the drum 36, where there may be an obstruction (e.g. a drive shaft).

The beams 32A and 32B are capable of producing a further series of circumferentially-spaced perforations extending for about ±60° on the undersides of the cigarettes. In order to make perforations outside the range of the beams 32 and 32A or 32B a further mirror 45 is provided to produce one or more perforations on the sides of the cigarettes by means of a beam 32C. A further mirror could be provided to deflect the beam 32A (or 32B) to make a perforation on the other side of each cigarette. The beams 32A or 32B and 32C all operate through the gap between successive cigarettes 28, or at least during the period when the beam is not operating directly on the tops of cigarettes at or near position 28A.

Instead of using beams 32C to make perforations outside the normal ranges achievable with the beams 32 and 32A or 32B an auxiliary laser source could be used to provide a beam 132 which is focused by a lens 134 to provide a beam 132A part of which passes directly through a semi-silvered mirror 134 to impinge on a cigarette 31 and another part 132B of which is reflected by mirror 134 to impinge on cigarette 29. Since the source for beam 132 produces fewer perforations than the source for beam 32 it can be of relatively low power. A semi-silvered mirror similar to mirror 134 could be used to redirect part of the beam 32C so that perforations could be made on a side part of an additional cigarette (e.g. 28C) at the same time as on a side part of the cigarette directly perforated by beam 32C.

An alternative way of dealing with ventilation of cigarettes in the region of the circumference not readily accessible with the beams 32 and 32A or 32B is indicated in FIG. 4D which shows a cigarette 128 which has received perforations from the beams 32 and 32A or 32B around opposed parts 129 of its circumference. The perforations 133 and their depths are diagrammaticaly indicated: by controlling the duration and/or power of the pulses forming the outer perforations 133A these are made larger and/or deeper so that some ventilation is provided for the regions 135 not having perforations in the circumference.

In the arrangement of FIG. 4 the beam 32 from the laser source could be directed radially outward as opposed to inward, e.g. by using one or more reflectors to redirect a source beam extending parallel to the axis of the drum 26. In this case perforations on the radially outer parts of the cigarettes could be achieved by fixed mirrors positioned radially outwards of the drum 26, e.g. in positions similar to that of mirror 45.

FIG. 5 shows a further arrangement, in which a laser beam 46 extending parallel to the axis of a conveyor drum 48 carrying cigarettes 50 is split by a stationary prism 52 to produce beams 54 which impinge directly on one or more of the cigarettes and beams 56 which are reflected by fixed mirrors 58 onto the cigarettes. In this way a series of perforations may be made on each cigarette 50 as it passes through the various beams 54 and 56. Each beam 54 and 56 is focused by stationary lenses and/or mirrors (not all of which are shown).

FIGS. 6-8 show a system, incorporating a system similar to that of FIGS. 4 and 4A-4D, particularly suitable for perforating both streams of filter cigarettes issuing from a filter attachment machine. Referring first to FIG. 6, conveyor drums 60, 62 convey cigarettes 64 past a first laser beam 66 which is directed at a rotating disc 68 which has alternate clear and reflective segments. When a reflective segment of the disc 68 intercepts the beam 66 the latter is reflected through focusing lens 70 onto a cigarette 64 carried by the drum 60. Similarly, when a clear segment of the disc 68 intercepts the beam 66 the latter passes through the disc 68 and is reflected by a stationary reflector 72 through focusing lens 74 and on to a cigarette 64 carried by the drum 62. Note that the lenses 70 and 74 focus the beam in a manner similar to the lenses 33 and 38 of FIG. 4.

The beam 66 is pulsed and the rotation of the disc 68 is correspondingly timed so as to allow a series of perforations to be made in each of the cigarettes 64 carried by the drums 60 and 62 as they pass the position of the laser beams.

A second laser beam 76 is arranged at a different angular position of the drums 60 and 62 and cooperates with a similar rotating disc 78 and stationary reflector 80 to produce perforations in the inwardly-facing portions of the cigarettes 64 carried by the drums 60 and 62. Mirrors similar to the mirror 45 in FIG. 4 may be provided to produce additional perforations between the respective series of perforations produced by the beams shown in FIGS. 6 and 7. Instead of using sparate laser beams 66 and 76 a single beam, as in FIG. 4, could be used: the arrangement of FIGS. 6 and 7 using separate beams is more appropriate when the circumferential spacing between cigarettes 64 is insufficient to allow adequate time during rotation of drums 60, 62 for a beam corresponding to the beam 32A to perform the function of perforating radially-inner parts of the circumferences of the cigarettes between operations to perforate radially-outer parts of the circumferences of successive passing cigarettes.

FIG. 8 shows in more detail the rotating disc 68, comprising reflective segments 68A and clear segments 68B. Where the beam 66 is pulsed at source, an auxiliary beam chopper comprising a segmented wheel 82 rotatable with the disc 68 may be provided, particularly to produce a clean leading edge to each pulse (e.g. to avoid transient surges associated with electronic switching on of each pulse). Thus the segments of wheel 82 may be timed so that they momentarily intercept each beam pulse after it has been switched on at the source.

Instead of using rotating discs 68 and 78, which time-share the laser beam, semi-silvered mirrors for power-sharing the beam could be used.

FIG. 9 shows a further arrangement, for directing a pulsed laser beam 84 at cigarettes 86 carried by a conveyor drum 88, and using the principles of FIG. 4. The beam 84 is intercepted by a rotating mirror assembly 90 having four stepped faces 90A-90D for producing four parallel beams 92A-D. The beams 92A-D are respectively intercepted by a focusing/reflecting array 94 (comprising mirrors and lenses) arranged to produce beams having directions 96A-D, as indicated in FIG. 9. The beams 96A and 96D produce perforations at the sides of the cigarettes 96. The beam 96B produces a series of perforations on a portion of the circumference of each cigarette 86 which is outer relative to the drum 88. The beam 96C produces perforations on an inner portion of the circumference of each cigarette 86. Thus the beams 96B and 96C respectively correspond to the beams 32 and 32A in the FIG. 4. It will be appreciated that the pulsing of the beam 84, the rotation of the mirror assembly 90 and the rotation of the conveyor 88 are synchronised. Note that since the beams 96A and 96D each provide fewer perforations than the beams 96B and 96C, the corresponding faces 90A and 90D of the mirror assembly 90 may be correspondingly narrower than faces 90B and 90C.

FIGS. 10 and 11 show a further system, in which a laser beam 98 is directed along a path substantially parallel to the axis of a drum 100 carrying filter cigarettes 102. The beam 98 is intercepted by an inclined mirror 104 which diverts the beam along a path 106 towards a fixed focusing mirror 108 which produces a further beam 110 focused on a cigarette 102. The mirror 104 is rotatable about an axis parallel to that of the beam 98 and as it rotates, the position of path 106 changes, as indicated at 106A-106F in FIG. 10. The mirror 108 is so shaped that the corresponding focused beams 110A-110F are focused on different points on the circumference of a cigarette 102, taking into account that the drum 100 is continuously rotating so that the cigarette is moving.

As indicated in FIG. 10, a series of perforations around the whole circumference of each cigarette 102 may be achieved by pulsing the beam 98 at appropriate times and selection of a suitably shaped mirror 108. It will again be appreciated that the pulsing of the beam 98, the rotation of the mirror 104, and the rotation of the drum 100 are synchronised.

Instead of being continuous the mirror 108 could comprise a series of discrete portions with each portion arranged to produce a focused beam which tracks a particular spot on a cigarette. With this arrangement the focused beam would switch automatically from one spot to another as the beam from the rotating mirror 104 passed from one portion to another. Thus the beam 98 could in this case be continuous, the switching between different spots on the cigarettes being achieved automatically by passage of the beam 106 between discrete portions of the mirror 108.

The shape of the mirror 108 may be somewhat simplified if only part of the circumference of each cigarette is perforated using the mirror. Thus two or more mirrors may be used with two or more laser beams (which may be provided from a single laser source) to make a complete series of perforations around each cigarette. If two or more beams are used these need not operate on a cigarette at the same rotational position of the drum. Conveniently two focusing mirrors may cooperate with inclined mirrors (corresponding to mirror 104) rotating in opposite directions: the two focusing mirrors may then have symmetrical shapes.

In the system of FIG. 12 a laser beam 112 is directed along a path parallel to the axis of a conveyor drum 114 carrying filter cigarettes 116. A polygonal mirror 118 rotating about a parallel axis provides a beam 120 which is directed onto a linear scanning device 122. Mirrors such as the mirror 118 are available from Aryt Optical Industries Ltd., Israel. The device 122, which is a flat field scanning lens similar to that available from Melles Griot (France) under the type designation number 09LL 5055, is capable of producing from the beam 120 a focused beam 124 travelling on line 126 which at least partly or approximately follows the path of a cigarette 116 as it passes the device 122. By pulsing the laser beam 112 a series of perforations may be made in each passing cigarette 116. Alternatively, one or more circumferential slots could be made. The duration of each pulse may be used to control the size of each perforation (or the length of each slot). Since the focused beam 124 may be made at least partially to track each cigarette more time is available for making the perforations. Consequently a laser of lower maximum power may be used.

A moving beam such as produced by a rotating mirror such as the polygonal mirror 118 could be used to provide a beam which at least partially tracks a cigarette being conveyed on a drum in other systems, e.g. those of FIG. 4 or FIGS. 6–8.

In FIG. 13 a rotary mirror assembly 200 having two stepped faces 202, 204, each of which extends for 180° around an axis of rotation 201 of the assembly (i.e. similar to but simpler than the assembly 90 of FIG. 9), is arranged beyond a final focusing lens 206. As the assembly 200 is rotated about axis 201 a focused laser beam 208 is deflected along a path 210 or 212 depending on whether it is reflected by surface 202 or 204. The positions of focus of the beams on paths 210 and 212 lie on a line 214 and by arranging for cigarettes to be arranged transversely so that their peripheries successively pass the line 214 it is possible to provide two rows of perforations in each cigarette.

Note that because of the path length change introduced by the stepped faces 202, 204 the line 214 is inclined to the direction of the laser beam 207 incident on the lens 206. This means that the axis of a drum (not shown) conveying cigarettes parallel to the line 214 is not parallel to the beam 207. If this is inconvenient it is possible to use stationary reflecting mirrors cooperating with the rotating mirror assembly to eliminate any length change between the different paths at different reflective surfaces and so maintain the line of focus parallel to an originating laser beam. The principle of this is shown in FIG. 14 where the rotary mirror assembly 200, with reflective surfaces 202, 204, is supplemented by stationary mirrors 220, 222. Thus a beam 228 is reflected by surface 202 and then in turn by mirrors 220 and 222 and the other surface 204 to produce beam 230 or, alternatively, and as indicated by dotted lines, by surface 204 and mirrors 220 and 222 and the other surface 202 to produce beam 232. As may be seen from the drawing the beams 230 and 232 are transversely spaced and so capable of making two rows of perforations. In addition since the path lengths of the beams 230 and 232 to a line 234 transverse to the beams 230, 232 and parallel to beam 228 are equal the focus positions of the beams 230, 232 lie on a line parallel to this line and hence parallel to beam 228.

References made herein (including in the claims) to pulsing the laser beam do not necessarily imply pulsing at source (i.e. electronically): mechanical means, e.g. a chopper wheel, may be used to pulse a continuous beam. In particular, if the power of the laser is matched to the energy required to make the perforations (i.e. dependent on number and size in unit time) it may be preferred to run the laser continuously and rely on external means to control the time during which the laser team dwells at any particular position at which it is required to make a perforation. Typically the external means will be effective to switch the laser beam between different positions, possibly on different cigarettes. Thus, for example, discs similar to the discs 68 and 78 in the apparatus of FIGS. 6–8 can be used to switch a continuous beam back and forth between cigarettes respectively on drums 60 and 62.

FIG. 15 shows another arrangement by which cigarettes 300 conveyed on a drum 302 may be provided with perforations extending for about + or −60° on their radially outer and radially inner sides (i.e. regions corresponding to regions 129 in FIG. 4D), and also in the intermediate regions not readily accessible to generally radial beams (i.e. regions 135 in FIG. 4D). Thus an incident laser beam 332 is operable to produce a series of perforations on the radially outer parts of passing cigarettes at an angular position of the drum 302 indicted generally by the reference 334. During the spaces between passing cigarettes 300 the beam 332 is redirected and refocused by a unit 336 causing perforation of the radially inner regions of cigarettes at a position generally indicated at 338. In addition the beam 340, when not creating perforations at 338, is redirected by static mirrors 342, 344 and lens 346 so that it impinges on a beam splitter 348 (equivalent to a semi-silvered static mirror) to produce resultant beams 350, 352 which respectively make perforations in the trailing and leading regions of cigarettes conveyed on the drum 302.

Note that an advantage of having an array of perforations around the circumference of a cigarette which is not totally symmetrical is that the smoker can hold the cigarette in a region (e.g., 135, FIG. 4D) where there are no (or few) perforations and thus not substantially impair the ventilation properties of the cigarette. If necessary, the wrapper for the filter could have marks where there are no or few perforations, so that the smoker would know where to grip the cigarette.

References herein to semi-silvered mirrors (e.g. mirror 348 in FIG. 15) does not necessarily imply use of devices identical to such mirrors used for optical frequencies: at frequencies of laser commonly used for causing perforations in cigarettes the functionally equivalent devices more commonly used are so-called beam splitters (usually of multi-dielectric construction).

We claim:

1. A method of making perforations in cigarettes, comprising conveying cigarettes along a first arcuate path about an axis in a direction transverse to their lengths, directing a beam of laser radiation, and successively intercepting the beam with means movable with the cigarettes along a further arcuate path about said axis to cause the beam to be redirected along a plurality of second paths, said second paths intercepting said first path at positions spaced on said first path and from different directions, so that a cigarette receives circumferentially spaced perforations from the beams on said second paths as it is conveyed on said first path.

2. A method as claimed in claim 1, wherein the means movable with the cigarettes causes radiation to be sequentially directed along said second paths.

3. A method as claimed in claim 1, wherein the means movable with the cigarettes causes parts of the beam to be simultaneously directed along said second paths.

4. A method as claimed in claim 1, wherein the second paths intercept substantially diametrically opposite parts of a cigarette on said first path.

5. Apparatus for making perforations in cigarettes, comprising a conveyor drum for carrying in series of spaced cigarettes in spaced flutes in a direction transverse to their lengths, means for directing a beam of laser radiation along a path, and an array of reflectors supported on an annular ring arranged coaxially with said conveyor drum for intercepting the beam on said path, said reflectors being movable with the conveyor drum and causing at least part of the beam to be redirected at at least one cigarette on the conveyor drum for making a perforation in the wrapper thereof while a reflector is in said path.

6. Apparatus as claimed in claim 5, wherein said reflectors are movable along a path which traverses the path of the beam.

7. Apparatus as claimed in claim 6, wherein each reflector of said array of reflectors is associated with a cigarette position on said conveyor.

8. Apparatus as claimed in claim 7, wherein a plurality of reflectors is arranged to be simultaneously in the beam path, each reflector directing part of the beam at different parts of the same or different cigarettes on the conveyor.

9. Apparatus as claimed in claim 5, wherein the reflectors are arranged so that at least part of the beam is not intercepted for at least part of the time, including means for directing said at least part of the beam along a further path at different parts of the same or different cigarettes on the conveyor.

10. Apparatus as claimed in claim 9, including further reflectors movable with the conveyor for intercepting that part of the beam not intercepted by said array of reflectors.

11. Apparatus as claimed in claim 6, wherein the annular ring comprises a series of reflectors each of which is arranged to focus the beam on a particular part of a cigarette when the reflector is in the beam path.

12. Apparatus as claimed in claim 11, including a further annular ring of reflectors arranged coaxially with the drum, said further ring of reflectors being arranged to direct radiation at other parts of the cigarettes on said drum.

13. Apparatus as claimed in claim 12, wherein said annular ring comprises elements intended to direct radiation along a path towards said further annular ring.

14. Apparatus as claimed in claim 13, wherein said elements comprise gaps between reflectors in said annular ring, through which gaps radiation passes as the ring rotates through the beam path and is redirected at said further annular ring.

15. Apparatus as claimed in claim 12, wherein said annular ring and said further annular ring are respectively arranged at radially outer and radially inner positions relative to the path of cigarettes on said drum.

16. Apparatus as claimed in claim 12, wherein at least some of the reflectors on said annular ring are semi-silvered to allow some of the radiation to be directed along a path towards said further annular ring.

17. Apparatus as claimed in claim 12, wherein said annular ring comprises further reflectors for directing radiation directly towards said further annular ring.

18. A method of making perforations in cigarettes, comprising conveying cigarettes along a path in a direction transverse to their lengths, directing a beam of laser radiation towards said path while focusing the beam at a position on or adjacent said path, causing said beam to be pulsed, at least in the vicinity of said path, so as to make at least two circumferentially-spaced perforations in each passing cigarette, the focusing position of said beam being substantially unchanged during production of said perforations so that at least one of said perforations is made at a position spaced from said focusing position.

19. A method as claimed in claim 18, comprising selecting the focusing position of the beam so that perforations of predetermined size are made over a substantial part of the circumference of a passing cigarette.

20. A method of making perforations in cigarettes, comprising conveying cigarettes along a path in a direction transverse to their lengths, directing a beam of laser radiation towards said path while focusing the beam at a position on or adjacent said path, causing said beam to be pulsed, at least in the vicinity of said path, so as to make at least two circumferentially-spaced perforations in each passing cigarette, maintaining the focusing position of said beam, selecting the focusing position of the beam so that perforations of predetermined sizes are made over a substantial part of the circumference of a passing cigarette, and focusing the beam so as to produce a varying cross-sectional profile of the beam, at least in the region where it will impinge on the circumference of a cigarette.

21. A method as claimed in claim 20, wherein the profile is arranged so that it differs in size and/or shape at the different positions at which it is desired to form perforations, so as to compensate at least partly for differences in at least one of the following parameters relating to the portion of the circumference of the cigarette on which the beam is incident during perforation: distance from said focusing position; angle of incidence of the beam; and speed of movement of the cigarette relative to the beam.

22. A method as claimed in claim 21, wherein said profile is arranged so as to produce perforations of substantially equal areas in different parts of the circumference of said cigarette.

23. A method of making perforations in cigarettes, comprising conveying cigarettes in sequence past a pulsed laser beam so as to cause said laser beam to form a plurality of circumferentially-spaced perforations in part of each cigarette during spaced periods as it passes the beam, and directing the beam during intervals between said spaced periods so that it applies perforations to at least one different part of a cigarette, including directing the beam during said intervals on a path which passes between said cigarettes conveyed in sequence.

24. A method as claimed in claim 23, wherein cigarettes are conveyed on a drum, comprising the steps of applying a series of circumferentially-spaced perforations to parts of each cigarette which are radially-outer relative to the drum as the cigarette passes the beam, and redirecting the beam during said intervals to perforate different parts of a cigarette along a path which is at least partly radially-inner relative to the positions of said cigarettes on said drum.

25. A method as claimed in claim 24, wherein the redirected beam passes substantially across the drum to perforate radially-inner parts of a cigarette.

26. A method as claimed in claim 24, wherein the redirected beam is further redirected from a radially-inner position relative to said drum to a radially-outer position, from which radially-outer position the redirected beam is directed at a different cigarette.

27. A method as claimed in claim 26, wherein said beam directed at said different cigarette has a substantial tangential component of direction relative to said drum so as to form at least one perforation in at least one of the trailing or leading sides of said different cigarette relative to its direction of conveyance by said drum.

28. A method of making perforations in cigarettes, comprising conveying cigarettes in sequence past a pulsed laser beam so as to cause said laser beam to form a plurality of circumferentially-spaced perforations in part of each cigarette during spaced periods as it passes the beam, directing the beam during intervals between said spaced periods so that it applies perforations to at least one different part of a cigarette, and forming a first series of perforations in each cigarette during said spaced periods and a second series of perforations in each cigarette during said intervals, said first and second series lying in substantially opposite sectors of the circumference of said cigarette.

29. A method as claimed in claim 28, in which the perforations in at least one of said series are formed in sequence as the cigarette passes a pulsed laser beam.

30. A method as claimed in claim 28, including the step of separately forming at least one perforation in a region of the circumference of the cigarette lying between the regions containing said series of perforations.

31. A method as claimed in claim 28, in which at least one perforation at or adjacent the edge of the region of the circumference of the cigarette containing said series of perforations is significantly larger and/or deeper than other perforations in said series, so that it extends partly in or towards a sector corresponding to the circumference of said cigarette not containing said series of perforations.

32. A method as claimed in claim 18, including the steps of conveying two parallel streams of cigarettes and forming perforations in both streams from the same laser beam.

33. A method as claimed in claim 32, in which the beam is alternately directed at one or the other of said streams.

34. A method as claimed in claim 32, in which the beam is split into portions, one of which passes to one of said streams and the other of which passes to the other of said streams.

35. A method of making perforations in cigarettes, comprising conveying cigarettes along a path in a direction transverse to their lengths, directing a beam of laser radiation towards said path while focusing the beam at a position on or adjacent said path, causing said beam to be pulsed, at least in the vicinity of said path, so as to make at least two circumferentially-spaced perforations in each passing cigarette, maintaining the focusing position of said beam, conveying two parallel streams of cigarettes and forming perforations in both streams from the same laser beam, wherein the laser beam is pulsed electronically, including the step of interrupting the initial part of each pulse of radiation to avoid transient surges which may occur immediately after switching of each pulse.

36. Apparatus for making perforations in cigarettes, comprising means for conveying cigarettes in sequence in a direction transverse to their lengths, rotatable means having movement synchronised with that of the conveying means, means for directing a laser beam towards the rotatable means, the rotatable means having stepped parallel reflecting surfaces arranged at different coaxial positions to intercept the beam in turn and direct it along different paths, and means for focusing the beam on said different paths so that each cigarette receives at least one perforation as it intercepts a beam on each path, said perforations being in circumferentially-spaced and/or longitudinally-spaced positions on the cigarette.

37. Apparatus as claimed in claim 36, wherein the rotary element includes means arranged to produce substantially parallel beams, and said focusing means is arranged to direct said beams towards cigarettes in substantially different positions on said conveyor.

38. Apparatus as claimed in claim 37, wherein each cigarette receives circumferentially-spaced perforations from said beams as it is conveyed by said conveying means.

39. Apparatus as claimed in claim 36, wherein the rotary element is arranged to produce substantially parallel beams, and said focusing means is arranged to focus said beams on longitudinally-spaced positions of each cigarette in turn at substantially the same position.

40. Apparatus as claimed in claim 36, wherein the focusing means includes both lenses and reflective elements.

41. Apparatus for making perforations in cigarettes, comprising means for conveying cigarettes in sequence in a direction transverse to their lengths, a rotary element having movement synchronised with that of the conveying means, means for directing a laser beam towards the rotary element, the rotary element having stepped reflecting surfaces arranged to intercept the beam in turn and direct it along different paths, and means for focusing the beam on said different paths so that each cigarette receives at least one perforation as it intercepts a beam on each path, said perforations being in circumferentially-spaced and/or longitudinally-spaced positions on the cigarette, said focusing means including means for compensating for shift in focal position caused by different positions of said stepped reflective surfaces.

42. Apparatus as claimed in claim 41, wherein said focusing arrangement includes a lens having an axis inclined to the angle of incidence of a beam, and arranged so as to refocus an image lying in a first plane so that it lies in a second non-parallel plane.

43. Apparatus as claimed in claim 41, wherein the compensating means includes means for increasing the path length of a first beam reflected from one of said stepped reflective surfaces relative to the path length of a beam reflected from another of stepped reflective surfaces.

44. Apparatus for making perforations in cigarettes, comprising means for conveying cigarettes in a direction transverse to their lengths, a reflecting element, and means for directing a laser beam towards the reflective element, said element causing said beam to be reflected along a plurality of paths so that it impinges on a plurality of cigarettes at different positions of said conveying means and so that after successive cigarettes have passed through said positions each has received a series of circumferentially-spaced perforations, at least one of said paths extending transversely between cigarettes conveyed by said conveying means.

45. Apparatus for making perforations in cigarettes, comprising means for conveying cigarettes in a direction transverse to their lengths, means for directing a pulsed laser beam in a direction which has a component which is radial relative to an axis generally parallel to the cigarettes, a continuous reflective surface, and means for causing said beam to rotate about said axis so that it impinges on successive points on said continuous reflective surface to focus the beam on different parts of a cigarette, the rotation of the beam and the movement of the cigarette being synchronised.

46. Apparatus for making perforations in cigarettes, comprising means conveying cigarettes in a direction transverse to their lengths, and means for directing a laser beam towards cigarettes as they are conveyed so as to make circumferentially-spaced perforations in each cigarette, including tracking means for causing the beam at least partly to track the movement of the cigarette as it is conveyed by said conveying means, wherein said directing means includes means for directing the beam in a direction generally parallel to the cigarettes, and said tracking means includes a reflective element rotating about an axis parallel to said direction, and further including means for reflecting towards a cigarette a beam received from said tracking means on a path extending across the path of cigarettes conveyed by said conveying means.

47. Apparatus for making perforations in cigarettes, comprising means for conveying cigarettes in a direction transverse to their lengths, and means for directing a laser beam towards cigarettes as they are conveyed so as to make circumferentially-spaced perforations in each cigarette, including tracking means for causing the beam at least partly to track the movement of the cigarette as it is conveyed by said conveying means, wherein a flat field scanning lens is arranged between said reflective element and the cigarette being perforated, so as to produce a focused beam travelling at least partly with said cigarette.

48. A method as claimed in claim 1, wherein the further arcuate path is radially outer of said arcuate path.

49. A method as claimed in claim 1, wherein said beam is directed along a path which is parallel to said axis and on the opposite side of said first arcuate path to said axis.

50. Apparatus as claimed in claim 45, wherein said continuous reflective surface has the general shape of an involute curve.

* * * * *